March 5, 1957    J. H. PRINCE ET AL    2,783,793
LINEAR SAW BLADE GUIDE
Filed June 3, 1953    3 Sheets-Sheet 1
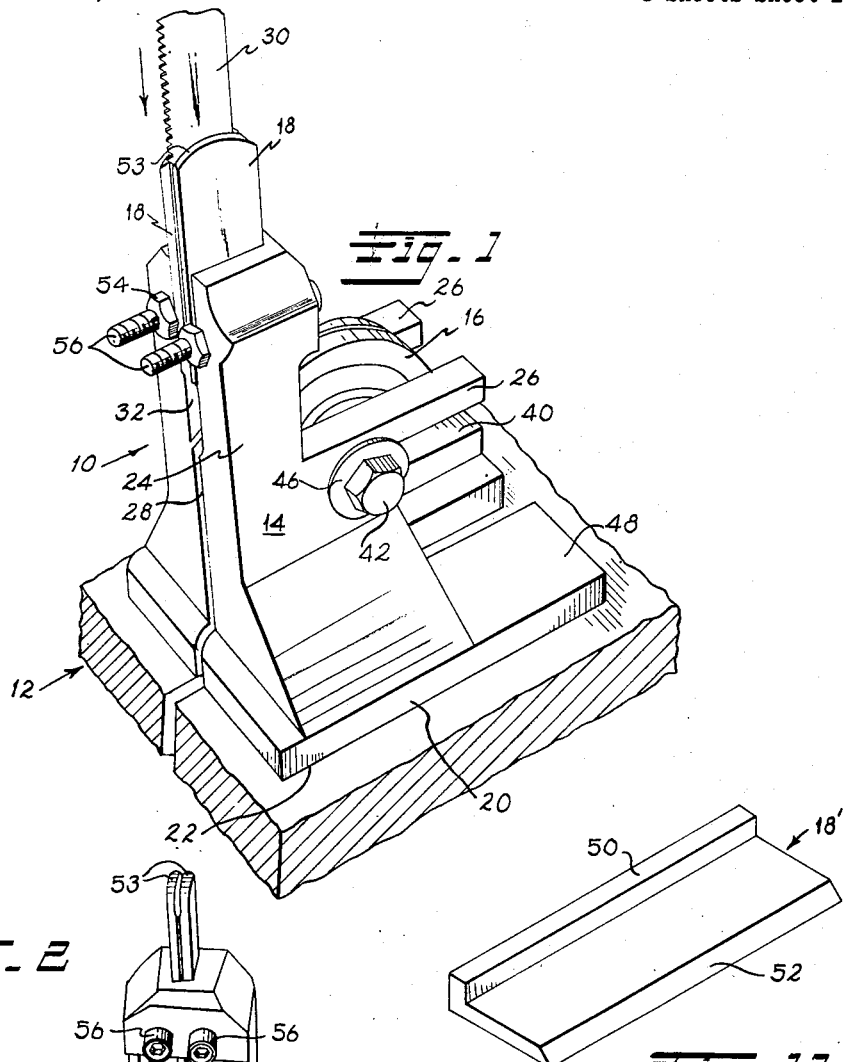
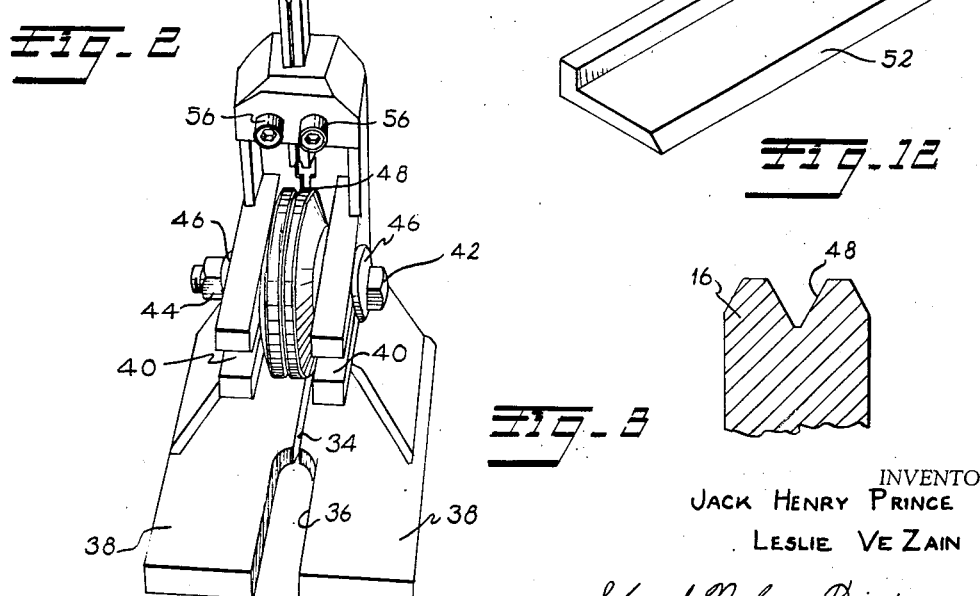
INVENTORS
JACK HENRY PRINCE
LESLIE VE ZAIN
BY Strauch, Nolan, + Diggins
ATTORNEYS March 5, 1957 J. H. PRINCE ET AL 2,783,793
LINEAR SAW BLADE GUIDE
Filed June 3, 1953 3 Sheets-Sheet 2
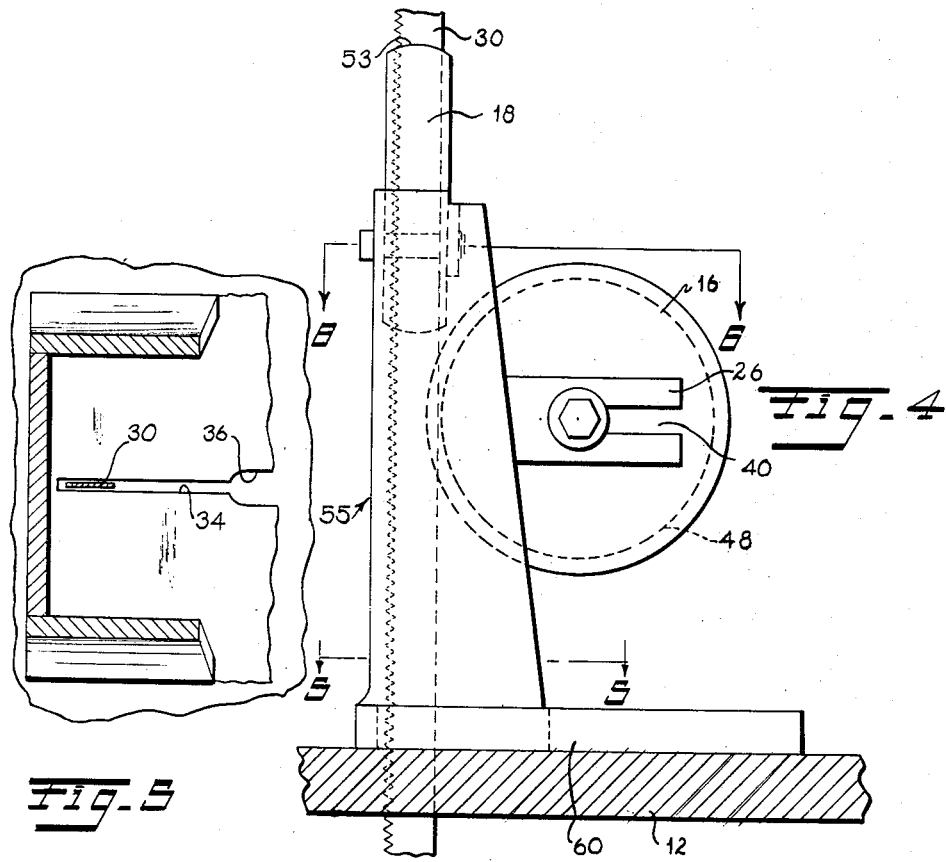
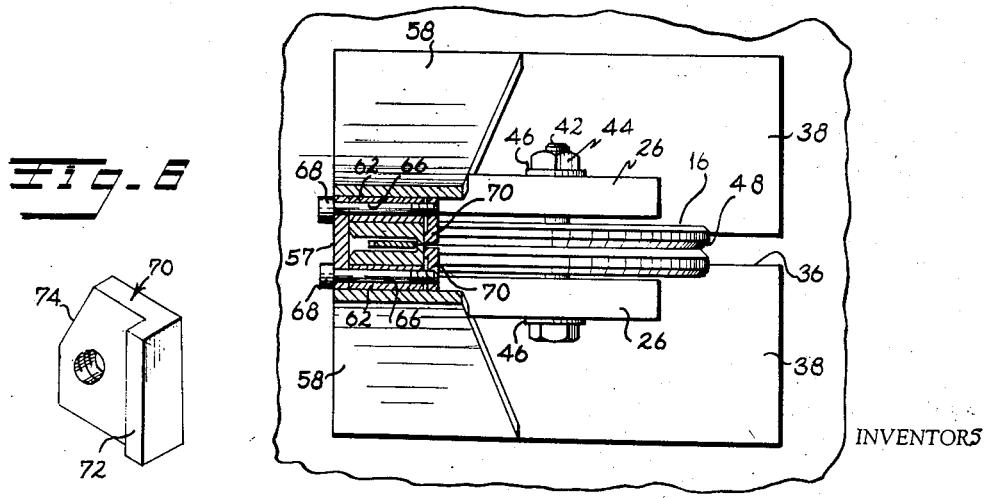
INVENTORS
JACK HENRY PRINCE
LESLIE VE ZAIN
BY Strauch, Nolan & Diggins
ATTORNEYS

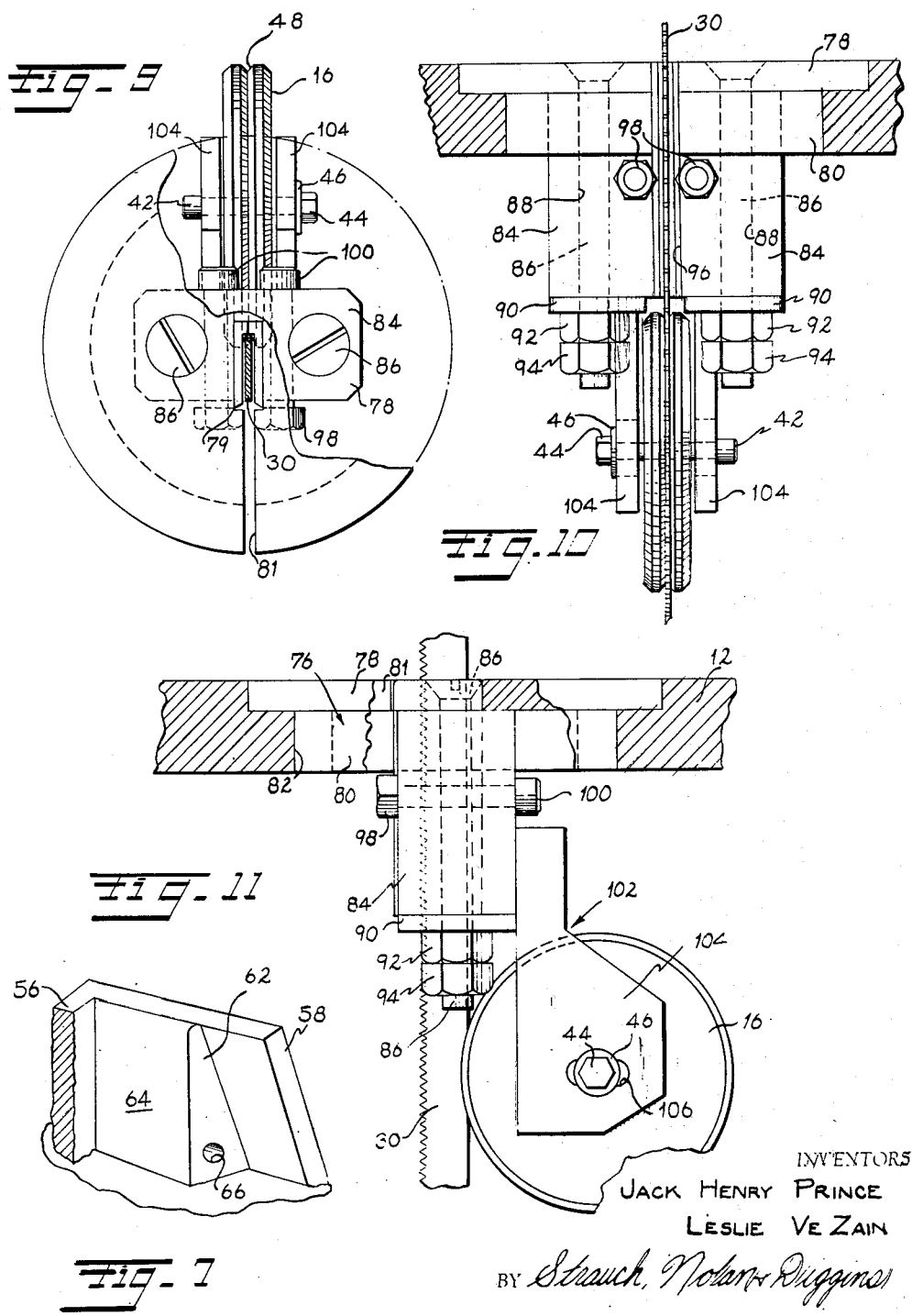

United States Patent Office 2,783,793
Patented Mar. 5, 1957

2,783,793
LINEAR SAW BLADE GUIDE

Jack Henry Prince and Leslie Ve Zain, San Diego, Calif., assignors to Solar Aircraft Company, San Diego, Calif., a corporation of California Application June 3, 1953, Serial No. 359,250

7 Claims. (Cl. 143—162)

This invention relates to band saws in general, more particularly to such saws for high speed cutting, and specifically to blade guide and work support means for such saws.

In band sawing machines, a long relatively thin metal cutting blade is welded into a continuous band and tensioned on the power wheel and support wheel of a saw frame. While standard sawing machines enclose a substantial portion of the blade for safety reasons, as is well known in the art, and certain prior practices have to some extent increased the safety factor and provided auxiliary devices to aid the saw operator and improve the operation of the saw, many problems and difficulties such as excess blade breakage, inability to cut small radii, comparatively slow speed of cutting, and other failings continue to exist in the band saw field despite diligent efforts to overcome them. These problems are for the first time eliminated by the present invention.

More than 50 years ago, Connell recognized some of these problems and attempted to solve them with the complex and expensive device of his Patent No. 575,416. Subsequently Culpepper, Patent No. 758,619, and Wallace, Patent No. 1,435,997, added slightly to the art of guiding and backing up the saw blade while Brenner, Patent No. 1,452,179, and Christie, Patent No. 2,472,570, developed rudimentary work supporting means.

However, all known prior devices have been either extremely complex and expensive, or merely inefficient, unsatisfactory means of partially solving previously encountered problems.

The problem of blade breakage is a serious one in industry for a number of reasons. Blade stock, i. e., the standard, toothed, high-tempered stock used on band sawing machines is expensive and breakage results not only in the cost of replacement but in lost production time. Furthermore, due to its highly tempered condition, the blade has a tendency to whip violently when breakage occurs and frequently results in serious injury to the operator.

The present invention contemplates a blade guide and support device which not only reduces the frequency with which breakage occurs in conventional saw blades but also permits the use of less expensive, fully annealed, untoothed blades such as common box strap material, thus further reducing the cost of replacement and lost time and also eliminating the serious safety hazard resulting from blade breakage.

Therefore, a primary object of the invention is to provide various forms of blade guides, some being combination blade guides and work piece supports and all of which are of simple, inexpensive constructions.

Another important object of the invention is the provision of novel combination blade guide and work piece supports for band saw machines which will allow highly satisfactory use of such material as common box strap or metal banding tape for the cutting element, as will be more fully explained hereinafter.

Still another major object is the provision of improved guide and support means for band saws which greatly increase the operational safety of the saw while making possible substantially increased cutting speeds.

Another object is the provision of an improved blade guide which greatly increases the life of the blade.

Yet another object is the provision of novel attachments for saw machines allowing and simplifying the cutting of small radii and complex configurations.

Still another object of one form of the invention is to provide improved blade guide means which may be quickly and easily attached to conventional band saws without obstructing the saw table.

Another object is the provision of a novel combination blade guide and work support, in which the guiding and supporting elements are adjustable and replaceable.

These and other objects and advantages of the invention will become apparent to those conversant with the art as the following description of preferred forms of the invention proceeds in connection with the sub-joined claims and the annexed drawings wherein:

Figure 1 is a perspective elevational view of a preferred embodiment of the invention as installed on a portion of the table of a conventional band sawing machine;

Figure 2 is a perspective elevational view of the structure shown in Figure 1 as viewed from the rear;

Figure 3 is a fragmental sectional view taken on a radius of the back-up wheel of the present invention;

Figure 4 is a side elevational view of a modified form of the invention;

Figure 5 is a sectional view taken on line 5—5 of Figure 4;

Figure 6 is a sectional view taken on line 6—6 of Figure 4;

Figure 7 is a fragmental perspective elevation of a portion of the frame of the embodiment shown in Figures 4, 5 and 6;

Figure 8 (Sheet 2) is a perspective elevational view of a retaining element employed in the embodiment shown in Figures 4, 5, 6 and 7;

Figure 9 (Sheet 3) is a top plan view of still another modification of the invention;

Figure 10 is a front elevational view of the structure shown in Figure 9;

Figure 11 is a side elevational view of the structure shown in Figures 9 and 10; and Figure 12 (Sheet 1) is an enlarged perspective view showing the details of construction of one form of the guide blade members employed in the invention.

Referring now to Figure 1, a preferred embodiment of the saw blade guide and work piece support assembly according to the present invention is generally indicated at 10, this particular form of construction being adapted for use on top of the saw table, partially shown at 12, of a conventional band saw machine (not shown). It consists essentially of a hollow frame or body member 14, a back-up wheel 16 and a pair of identical and therefore, interchangeable blade guide elements 18.

Frame 14 preferably is of unitary cast metal construction having a minimum of machined surfaces although it may be fabricated from flat stock assembled by welding or like bonding procedure.

The frame consists of a base 20 having a flat bottom surface 22, an upright portion 24, and a pair of spaced, parallel, horizontal legs 26 projecting rearwardly from the upright portion.

A slot 28 is machined or otherwise formed in the forward wall of the frame to accommodate passage of a band saw blade 30 and has an enlarged upper section 32 adapted to receive blade guide elements 18. Surface 22 of the base is machined to bring it into perpendicularity with the axis of slot 28 and to provide a stable mounting pad for supporting the frame on table 12.

As clearly appears in Figures 1 and 2, base 20 is formed with a continuous axial slot 34, in the same plane as and perpendicular to the axis of slot 28 in the forward wall of the frame. The rear portion of slot 34 is enlarged as at 36 to define a pair of integral mounting flanges 38 for securing the frame 14 to the saw table as by means of standard C clamps. This is a preferred method of attachment inasmuch as it facilitates positioning of the device in relation to the blade but, if desired, flanges 38 may be provided with bolt holes corresponding with tapped holes in the top of table 12 and the device secured by means of bolts. It will be appreciated that, with the present invention, the customary knock-out plate or insert (not shown) in the table is not required and, therefore, may be removed and discarded prior to installation.

Legs 26 are bifurcated to define parallel horizontal slots 40 coacting to adjustably support an axle in the form of a bolt 42 which has its opposite ends slidably disposed therein. Backup wheel 16, which may be any standard wheel of suitable type, e. g., a Number 1 Paddock Wheel, Model 617–R, is rotatably journalled on the section of bolt 42 between legs 26, by means of suitable anti-friction bearings (not shown) in the hub of the wheel. A nut 44 threaded on the bolt may be drawn up tight to lock the bolt in any desired position of adjustment along slots 40, suitable washers 46 being provided under the bolt head and nut as is standard practice. As clearly shown in Figures 1 and 2, wheel 16 has a continuous circumferential groove 48 of V-form cross section, the bottom of which is flat and of a width approximating the thickness of the saw blade. (See Figure 3.)

The guide elements 18, fabricated as by milling from hardenable steel, alloy-steel or of molded tungsten carbide or like material, are treated for maximum hardness after completion of all machining operations. As will be seen from Figure 12, each guide element consists of a substantially rectangular flat plate having a longitudinal spacing rib 50 extending along one edge and a chamfer or bevel 52 on the opposite edge. It will be noted that the guide element shown in Figure 12 and designated generally by reference numeral 18' has square sheared ends to adapt it for use in a modification of the invention hereinafter described, whereas the guide elements 18 shown in Figures 1, 2, and 4 have rounded ends 53 which serve as work supports. Aside from this distinction the two types of guide elements 18 and 18' are identical.

Referring to Figures 1 and 2, guide elements 18 are assembled in face to face relation with the respective ribs 50 and bevels 52 in opposition to each other and held in this position in the enlarged section 32 of slot 28 as by nuts 54 threaded on the projecting ends of bolts 56 which are inserted from the rear of the frame through suitable holes (not shown) provided therein. The guides 18 thus form a forwardly opening blade receiving slot, the width of which is determined by the height of ribs 50. It will be noted that the lower ends of guides 18 are disposed well above the level of bolt 42.

The present invention may be installed on any standard sawing machine in the following manner:

The blade 30 is installed on the sawing machine and tightened in the conventional manner. The guide and support assembly of the invention is placed on the table 12 behind the blade and brought forward so that the blade guided by bevels 52 enters into slot 28 and the clearance space between the guides medially thereof and parallel thereto. The back edge of the blade should not engage spacing ribs 50. The frame is then secured in such position by means of clamps or the like applied to flanges 28 as explained hereinabove. If necessary, the position of the wheel 16 is adjusted by sliding bolt 42 axially along slots 40 so that the flat bottom portion of groove 48 on the wheel is positioned approximately 1/16 inch behind the back edge of the blade. It will be noted that when the nut 44 is tightened, the flat sides and parallelism of legs 26 in conjunction with washers 46, nut 44 and the head of bolt 42, serve to align the axis of the bolt in a vertical plane substantially perpendicular to the plane of the blade and its guide elements 18 and thus position the wheel so that its radial plane of symmetry coincides with the plane of the saw blade. Consequently, as will be seen from the description of the operation of the device which follows, the back edge of the blade will run freely in groove 48 when the blade is under sufficient load to bow rearwardly.

Before starting the machine, the guide elements are raised or lowered to accommodate the particular workpiece by loosening nuts 54. With the machine running, blade 30 moves downwardly in the direction of the arrow, Figure 1, and runs freely in the slot defined by the guide elements. As the workpiece is brought into contact with the cutting forward edge of the blade the pressure forces the back edge of the blade against wheel 16 and, more specifically, into the bottom of groove 48. Inasmuch as the wheel is freely rotatable, no drag or abrasion results and the appreciable bow or deflection which would ordinarily occur is limited to a nominal amount, viz., approximately 1/16 of an inch or less, if desired, depending on the adjustment of the wheel.

When the work is turned to cut out curves, the blade twist ordinarily occurring is limited to the comparitively small amount permitted by the clearance between the blade and the confining walls of hardened guide elements 18. Thus, the ability of the saw to cut short radius curves is greatly increased, the difficulty of such an operation is reduced and the likelihood of blade failure due to twisting is minimized.

Once the cut has been started, the work piece may be rested as the sawing proceeds on the rounded work supports 53 provided on the upper ends of the guide elements. The fact that this support is raised above the surface of table 12 facilitates cutting operations on intricate shapes and non-planar work pieces and thus greatly increases the flexibility of the apparatus.

A modification of the invention, particularly advantageous for use when unusually heavy sections are being cut and a more substantial work piece support is required, is illustrated in Figures 4, 5 and 6, wherein elements in common with the first described embodiment are identified by common reference characters. In this form, a frame 55 is formed of a substantially vertical forward wall 57, sloping side walls 58, and a base 60, all of which are cast or otherwise fabricated into a rigid, hollow structural unit open at the rear and top and resembling a frustum of a pyramid. The frame is provided with flanges 38, bifurcated legs 26, and back-up wheel 16 as described in the embodiment of Figures 1 and 2. However, slot 28 (Figure 1) is eliminated from the forward wall of frame 55 thus increasing its strength and rigidity for the support of heavier work pieces.

Referring to Figure 7, the upper portion of frame 55 and, more specifically, the portion at which walls 57 and 58 terminate is provided with a pair of identical wedge-shaped bosses 62 (one shown) secured to or integral with the inner opposing surfaces of walls 58.

The bosses are so constructed and arranged as to provide a pair of spaced parallel surfaces (one shown at 64) for slidably receiving and maintaining in face to face relation as already described, a pair of guide elements 18. A pair of parallel bores 66, extending through wall 56 and respective bosses 62, accommodate the insertion of a pair of screws 68 having threaded ends projecting rearwardly from the bores and threadedly engaging a pair of keepers or retaning nuts 70.

Each keeper (one shown, Figure 8) has a rib 72 extending along one lateral edge and a sloping portion 74 on the opposite edge corresponding to the slope of side walls 58 of the frame. Thus, when assembled as shown in Figure 6, the sloping portion 74 adapts the keepers to fit snugly and non-rotatably against the inner surfaces of the respective side walls with the respective ribs engaging a rear edge of one of the guide elements, thus allowing the guide elements to be adjusted vertically when screws 68 are loosened and securely clamping them in position against the inner surface of forward wall 56 when the screws are tightened up.

The manner of installation of this form of invention differs in that the blade enters the frame from the rear. Consequently, screws 68, keepers 70, guide members 18 and wheel 16 are first removed and the frame placed on table 12 in front of the blade 30 and moved rearwardly until the blade enters the zone between bosses 62 and is approximately centered therein.

Then, screws 68 and keepers 70 having been inserted and their threads started, the guide elements are assembled around the blade and pushed down between the bosses and the screws tightened.

Before securing the frame and adjusting wheel 16 in the manner hereinbefore described, the frame is moved forwardly to provide a minimum clearance of 1/16 of an inch between the cutting edge of blade 30 and the inner surface of wall 56 in order that chips formed during cutting may fall down to the base and work out the rear of the frame and not accumulate in the guide to obstruct the operation of the blade.

With the exception of differences specifically mentioned, the structure, adjustment, installation and operation of this form of the invention is the same as the first described embodiment.

In many instances, e. g., when flat sheets or bars are to be cut, it is desirable to utilize the flat surface of table 12 without the presence of any obstruction. The inventive concept herein disclosed may be applied with equal advantage to such usage in the form of a third modification shown in Figures 9, 10 and 11 wherein 76 designates generally a preferably cast body member similar to the regular knockout plate customarily provided in saw machines. Body 76 consists of a discoid portion or plate 78 having an annular concentric flange 80 of smaller diameter on the under surface adapting the body to fit snugly into a stepped aperture 82 of complementary diameters formed in the saw table 12, with the upper surface of plate 78 flush with the table top. Plate 78 contains a rectangular aperture 79 substantially centrally located therein and a slot 81 extending from one end of the aperture radially to the perimeter of the plate.

A mounting block 84 is rigidly supported beneath body 76 by means of a pair of bolts 86 having their heads countersunk in disc 78 and extending through parallel bores 88 in the block. The lower threaded portion of bolts 86 project from the respective bores and are provided with washers 90, nuts 92, and lock nuts 94.

A deep, narrow groove 96 aligned with and constituting in effect, an extension of aperture 79, extends the length of block 84 and is adapted to receive a pair of guide elements 18' (Figure 12) arranged in face to face relation as described above.

The guide elements 18' have square ends to be flush with the table top and provide no obstruction for the work piece while guiding the saw blade at a point as close to the cutting zone as possible. The elements 18' are retained in position by nuts 98 threaded onto a pair of bolts 100 extending horizontally through suitable, spaced parallel bores in block 84, adjacent and on either side of groove 96.

On its opposite side with respect to groove 96, block 84 is formed with or has permanently secured thereto a depending bracket 102 having a pair of spaced vertical ears 104.

A pair of aligned elongated slots 106, one in each ear 104, accommodate an axle bolt 42 for adjustably mounting a back-up wheel 16 in the same manner as in the previously described embodiments.

This third form of the invention may be installed by simply removing the conventional knockout plate and substituting the guide assembly in its place and adjusting the back-up wheel as explained hereinabove. Its operation is the same as that of the first- and second-described forms of the invention except that the work piece is supported on the saw table 12.

From the foregoing disclosure it will be noted that, in the forms of construction shown in Figures 1 and 4, the blade guides provide a work rest, supporting the work piece to facilitate a variety of cutting operations. For example, the point of support, being spaced above the saw table, permits greater facility of movement and greater accuracy of cutting and, being close to the cutting zone, provides support where the stress concentration is highest, minimizing flexure and vibration.

In all forms of construction, the combination of the guide elements and back-up wheel provide two-dimensional support for the blade, preventing twisting and limiting the amount of bowing, both laterally and rearwardly, to a safe value.

In this manner, the blade is effectively protected from twisting stress exerted thereon when cutting short radius curves and the bowing stress imposed by sudden loads. This protection makes feasible the use of box strap material or metal banding tape in place of the standard toothed stock. As an example of the savings effected by the invention, tests have shown that in a standard machine using standard blade stock without the present invention, a total of 7500 feet of blade material at a cost of $1,200 at current prices was expended in a given period while under the same conditions the same machine operating with common box strap as the blade material and using the present invention, utilized only 1061 feet of the cheaper blade material at a cost of less than $10.00 at current prices in the same given period.

In like manner, the invention permits very substantial increases in production rate, tests under controlled conditions showing an increase of nearly 30% in the number of parts per hour turned out, based on actual time saving and disregarding the time when the machines had to be shut down for blade replacement. In regard to shut downs for saw replacement it was noted that without the invention breakage occurred on an average of once every three hours while with the invention breakage occurred on an average of only once in 24.5 hours.

An additional safety factor is afforded by the invention, both by more complete enclosure of the blade and by permitting the use of untoothed fully annealed box strap material which has a tendency merely to collapse when broken rather than whip out violently like high-tempered conventional blade material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use with a sawing machine having a work table and a cutting blade movable linearly through an aperture therein: a frame comprising a supporting portion adapted to be supported by said work table and a guide mounting portion extending substantially parallel to said cutting blade, said guide mounting and supporting portions of said frame defining passage means for said cutting blade therethrough, a pair of guide elements each having at least one planar surface and a rib normal to and extending along one edge of said planar surface, means for removably retaining said pair of guide elements in said passage means with the elements in contact with the side walls thereof and with said ribs in mating engagement rearwardly of the rear edge of said cutting blade and said planar surfaces in spaced, parallel relation to define an elongated slot enveloping a portion of the sides and rear edge of said cutting blade, a peripherally grooved backup wheel, means for mounting said backup wheel on said frame for rotation about an axis perpendicular to the axial plane of said slot, said axis of rotation being so located that a portion of the grooved periphery of said wheel approaches tangency with the rear edge of said cutting blade at a point remote from the enveloped portion thereof and engages said rear edge only during substantial rearward deflection of said cutting blade under cutting pressures.

2. The device defined in claim 1, wherein said guide means are adjustably movable with respect to said frame in a direction parallel to the line of movement of said cutting blade.

3. The device defined in claim 2, wherein the supporting surface of said frame includes flange means for removably securing said frame to said table.

4. A combination work support and blade guide for sawing machines having a work table and a vertically driven cutting blade passing through an aperture in said work table comprising: a frame comprising a base adapted to rest on said work table and an upright portion on said base, said frame having walls defining a slot extending vertically through said upright portion and base for accommodating passage of said cutting blade therethrough, a pair of guide members disposed in said slot and adapted to closely envelop the sides and rear edge of a working section of said cutting blade, work supporting surfaces on the upper ends of said guide members, means for adjusting the vertical distance of said work supporting surfaces relative to said work table, a wheel mounted on said frame behind said cutting blade for rotation about an axis perpendicular to the plane of said cutting blade, and means for horizontally adjusting said axis whereby the periphery of said wheel may be moved into a position of substantial tangency with the rear edge of said cutting blade.

5. The combination according to claim 1 wherein the guide mounting portion of said frame comprises a forward wall and sloping sides defining a hollow generally frusto-pyramidal structure open at the rear and top adapted to envelop a substantial portion of said cutting blade with the cutting edge thereof disposed adjacent but spaced from the inner surface of said forward wall.

6. The combination according to claim 1 wherein said guide elements comprise a pair of identical hardened metallic plates having arcuate work supporting surfaces on their upper ends.

7. The combination according to claim 1 wherein said work table has an aperture and a body member is mounted in said aperture flush with the upper surface of said work table and said frame is rigidly secured to the underside of said body member.

References Cited in the file of this patent

UNITED STATES PATENTS

| | | |
|---|---|---|
| 455,980 | Ballew | July 14, 1881 |
| 465,631 | Pryibil | Dec. 22, 1891 |
| 575,416 | Connell | Jan. 19, 1897 |
| 758,619 | Culpepper | May 3, 1904 |
| 964,846 | Brueggemann | July 19, 1910 |
| 1,157,607 | Woelffer | Oct. 19, 1915 |
| 1,435,997 | Wallace | Nov. 21, 1922 |
| 1,452,179 | Brenner | Apr. 17, 1923 |
| 1,929,806 | Carter | Oct. 10, 1933 |
| 2,472,570 | Christie | June 7, 1949 |

FOREIGN PATENTS

| | | |
|---|---|---|
| 219,458 | Switzerland | May 16, 1942 |
| 608,767 | Great Britain | Sept. 21, 1948 |